United States Patent
Dayan et al.

(10) Patent No.: US 7,065,627 B2
(45) Date of Patent: Jun. 20, 2006

(54) METHOD AND SYSTEM FOR PROVIDING AN EVENT DRIVEN IMAGE FOR A BOOT RECORD

(75) Inventors: Richard Alan Dayan, Wake Forest, NC (US); Joseph Wayne Freeman, Raleigh, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 10/105,688

(22) Filed: Mar. 25, 2002

(65) Prior Publication Data

US 2003/0182530 A1     Sep. 25, 2003

(51) Int. Cl.
*G06F 12/00* (2006.01)
(52) U.S. Cl. .................. 711/173; 711/170; 711/202
(58) Field of Classification Search ............. 711/170, 711/173, 202, 203, 205, 206; 713/100, 2
See application file for complete search history.

(56) References Cited

U.S. PATENT DOCUMENTS

| | | | |
|---|---|---|---|
| 4,719,566 A | 1/1988 | Kelley | |
| 5,526,488 A | 6/1996 | Hershey et al. | |
| 5,787,491 A | 7/1998 | Merkin et al. | |
| 5,974,567 A | 10/1999 | Dickson, Jr. et al. | |
| 6,138,179 A | 10/2000 | Chrabaszca et al. | |
| 6,154,835 A | 11/2000 | Chrabaszca et al. | |
| 6,185,666 B1 | 2/2001 | Murray et al. | |
| 6,192,456 B1 | 2/2001 | Lin et al. | |
| 6,230,285 B1 | 5/2001 | Sadowsky et al. | |
| 6,279,093 B1 | 8/2001 | Beelitz | |
| 6,324,654 B1 | 11/2001 | Wahl et al. | |
| 6,401,183 B1 * | 6/2002 | Rafizadeh | 711/173 |
| 6,615,365 B1 | 9/2003 | Jenevein et al. | |
| 6,690,400 B1 * | 2/2004 | Moayyad et al. | 715/779 |
| 2003/0012114 A1 * | 1/2003 | Larvoire et al. | 369/100 |
| 2004/0068645 A1 * | 4/2004 | Larvoire | 713/1 |

FOREIGN PATENT DOCUMENTS

| EP | 1061447 | 12/2000 |
|---|---|---|
| GB | 2332962 | 7/1999 |
| WO | 0070449 | 11/2000 |

OTHER PUBLICATIONS

Tapken, J., "Interactive and Compilative Simulation of PLC-Automata," Simulation in Industry. 9th European Simulation Symposium 1997, San Diego, CA, USA. 6708088 INSPEC Abstract No. C2000-10-3220B-003.

(Continued)

*Primary Examiner*—Kimberly McLean-Mayo
(74) *Attorney, Agent, or Firm*—Sawyer Law Group LLP

(57) ABSTRACT

A method and system for providing an event driven hardfile image in a computer system is disclosed. The computer system includes a hardfile, a hardfile adapter, a master boot record and an operating system. The method and system include providing an extended physical partition table describing a plurality of partitions on the hardfile and defining at least one image using a utility. Each image corresponds to at least a portion of the plurality of partitions and to a corresponding event. An image is to be mapped to the master boot record in response to an occurrence of the corresponding event. The method and system also include providing an event driven table including each of the at least one image.

15 Claims, 6 Drawing Sheets

OTHER PUBLICATIONS

IBM Technical Disclosure Bulletin, "*Password Protection of Separate Hard Disk Partitions*", Nov. 1996, vol. 39, No. 11, pp. 103-104.

Josef Tapken, "*Interactive and Compilative Simulation of PLC-Automata*", Ninth European Simulation Symposium, 1997, San Digeo, CA.

* cited by examiner

METHOD AND SYSTEM FOR PROVIDING AN EVENT DRIVEN IMAGE FOR A BOOT RECORD

CROSS-REFERENCE TO RELATED APPLICATIONS

The present application is related to co-pending U.S. patent application Ser. No. 10/093,261 entitled "METHOD AND SYSTEM FOR EXTENDTNG A HARDFILE PARTITION TABLE"(RPS9-2001-0112) filed on Mar. 7, 2002, and assigned to the assignee of the present invention.

FIELD OF THE INVENTION

The present invention relates to computer systems, and more particularly to a method and system for altering the partitions booted based upon events occurring in the computer system.

BACKGROUND OF THE INVENTION

FIG. 1 depicts a conventional computer system 10. The conventional computer system 10 includes an operating system 12, a hardfile adapter 14 and a hardfile 20. The hardfile 20 includes partitions 22, 24, 26 and 28, a master boot record 30 and a legacy partition table 32 within the master boot record 30. Each partition 22, 24, 26 and 28 is thus a logical partition of the hardfile 20. Each of the partitions 22, 24, 26 and 28 can be a boot source. The legacy partition table 32 includes information relating to the partitions 22, 24, 26 and 28, including which partition is to be active for booting.

Although the conventional computer system 10 functions, one of ordinary skill in the art will readily recognize that there are drawbacks. In particular, only four partitions 22, 24, 26 and 28 are typically available. This is because the legacy partition table 32 is typically capable of storing data for no more than four partitions. Although extensible firmware initiative ("EFI") allows more partitions to be available on Intel Architecture ("IA") 64-bit systems, such a solution is not currently workable for other systems including IA 32-bit systems. As a result, even for current large capacity systems, only four partitions are typically available. Furthermore, although certain conventional systems allow more partitions to be available, there is no indication that the provision of the additional partitions is visible to the operating system 12. In other words, the user must perform an additional task in order to make the operating system 12 recognize the additional partitions. In addition, the user may also have to take other actions, such as setting a flag in the master boot record 30, in order to access the additional partitions.

Moreover, the master boot record 30 is static. As a result, the same partition 22, 24, 26 or 28 is the active partition if the hardfile 20 is selected as the boot device. The active partition is the partition that will be booted when the hardfile 20 is booted. This single partition 22, 24, 26 or 28 may not be optimal for many situations. Consequently, the performance of the computer system 10 suffers.

Accordingly, what is needed is a system and method for allowing the master boot record of a computer system to respond to different situations. The present invention addresses such a need.

SUMMARY OF THE INVENTION

The present invention provides a method and system for providing an event driven hardfile image in a computer system. The computer system includes a hardfile, a hardfile adapter, a master boot record and an operating system. The method and system include providing an extended physical partition table describing a plurality of partitions on the hardfile and defining at least one image using a utility. Each of the at least one image corresponds to at least a portion of the plurality of partitions and to a corresponding event. An image of the at least one image is to be mapped to the master boot record in response to an occurrence of the corresponding event. The method and system also include providing an event driven table including each image.

According to the system and method disclosed herein, the present invention provides a mechanism for allowing different sets of partitions to be mapped to the master boot record.

DETAILED DESCRIPTION OF THE INVENTION

Figure 1:
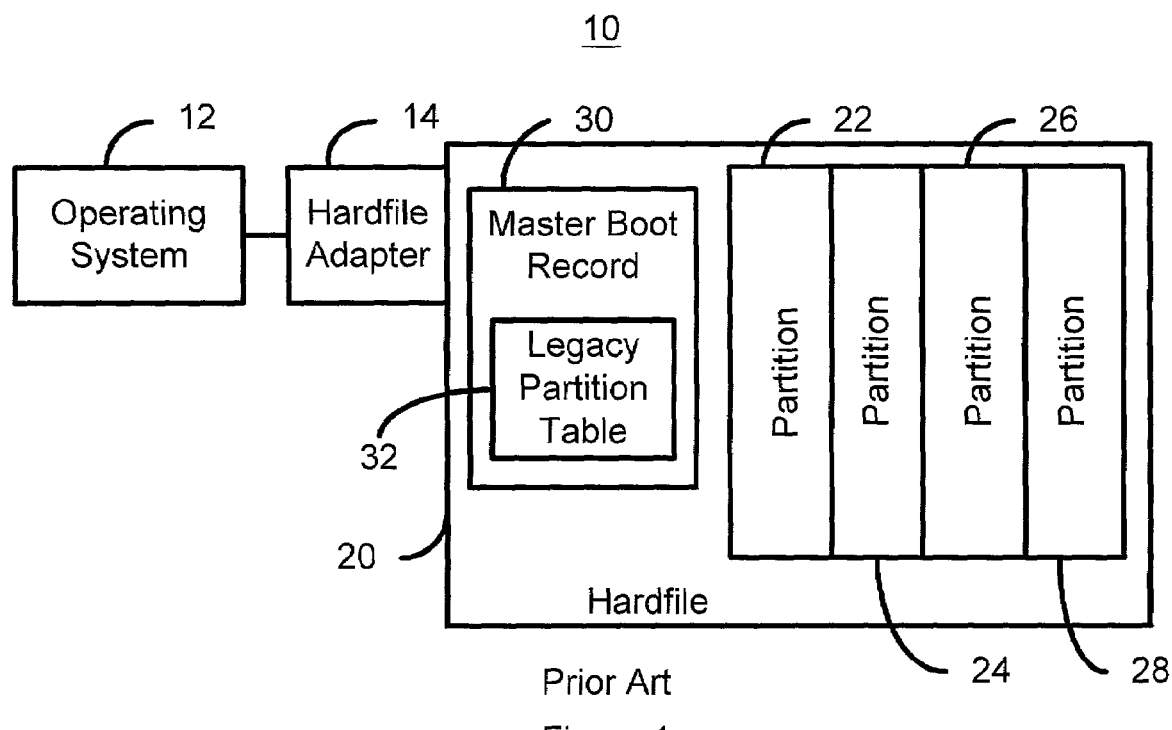
FIG. 1 is a block diagram of a conventional computer system.

The present invention relates to an improvement in computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present application is related to co-pending U.S. patent application Ser. No. 10/093,261 entitled "METHOD AND SYSTEM FOR EXTENDING A HARDFILE PARTITION TABLE"(RPS9-2001-0112) filed on Mar. 7, 2002, and assigned to the assignee of the present invention.

In the above-identified co-pending patent application, a method and system for extending the hardfile partition table and thus for extending the number of partitions for a hardfile. The method and system include providing a utility and an extended physical partition ("EPP") table using the hardfile adapter. The utility allows a user to define (initialize and/or revise) partitions. The number of partitions defined using the utility can be greater than the number of partitions otherwise available on a conventional computer system. In one embodiment of the method and system described in the above-identified copending patent application, the utility passes information relating to the partitions to the hardfile adapter. A portion of the partitions in the EPP table is mapped to the legacy partition table of the master boot record, preferably transparently to the operating system. Preferably, this is accomplished by consecutively mapping the portion of the plurality of partitions in the EPP table to the legacy partition table. Consecutive mapping includes mapping the partitions to the legacy partition table and providing a translation. The utility preferably maps the partitions to the legacy partition table. The hardfile adapter preferably provides the translation. The translation makes it appear to the operating system that the partitions mapped to the legacy partition table are consecutive and contiguous. The consecutively mapped partitions are considered to be mapped transparently because a user need not take any additional action for the operating system to recognize the partitions mapped to the legacy partition table.

The present invention provides a method and system for providing an event driven hardfile image in a computer system. The computer system includes a hardfile, a hardfile adapter, a master boot record and an operating system. The method and system include providing an extended physical partition table describing a plurality of partitions on the hardfile and defining at least one image using a utility. Each of the at least one image corresponds to at least a portion of the plurality of partitions and to a corresponding event. An image of the at least one image is to be mapped to the master boot record in response to an occurrence of the corresponding event. The method and system also include providing an event driven table including each image.

The method and system in accordance with the present invention is described in the context of a particular computers system having certain components. However, one of ordinary skill in the art will readily recognize that the present invention is consistent with other computer systems utilizing other components.

Figure 2A:
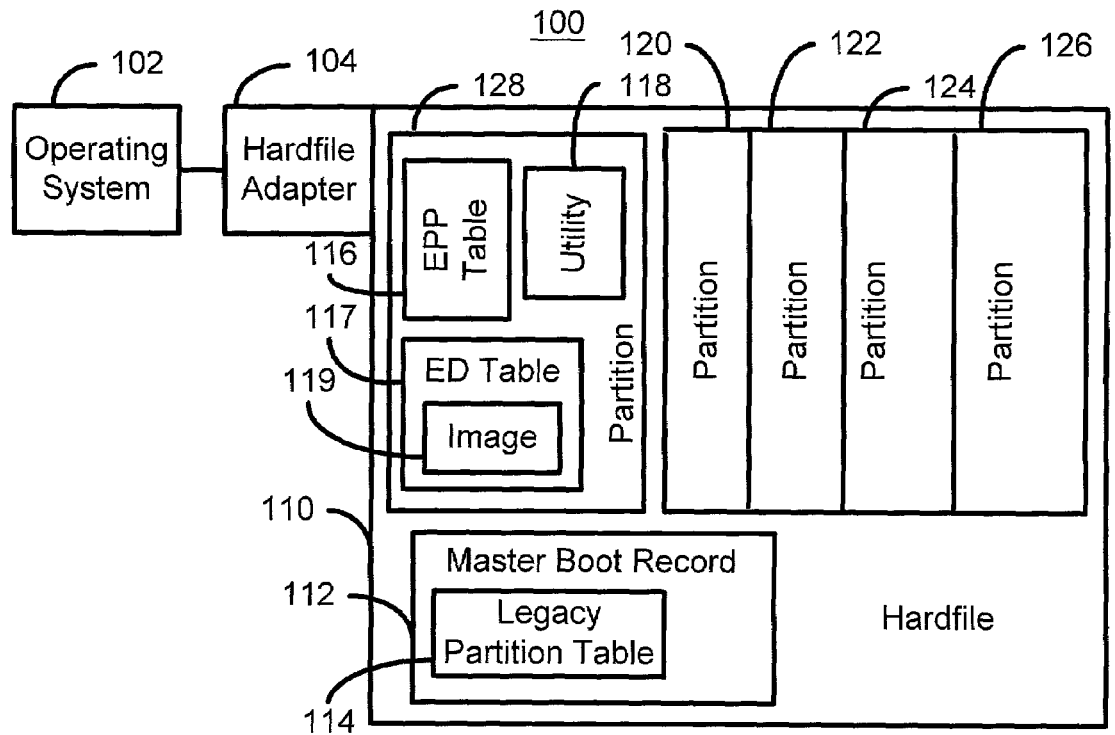
FIG. 2A is a block diagram depicting one embodiment of a computer system in accordance with the present invention that maps different partitions to the master boot record based upon the events occurring on the computer system.

To more particularly describe the present invention, refer to FIG. 2A, which is a block diagram depicting one embodiment of a computer system 100 in accordance with the present invention that maps different partitions to the master boot record based upon the events occurring on the computer system 100. The computer system 100 includes an operating system 102, a hardfile adapter 104 and a hardfile 110. The hardfile 110 includes a master boot record 112, a legacy partition table 114, an extended physical partition (EPP) table 116, a utility 118, an event driven (ED) table 117 and partitions 120, 122, 124, 126 and 128. Although five partitions 120, 122, 124, 126 and 128 are shown, only four partitions 120, 122, 124 and 126 are visible to the user. The partition 128 is preferably hidden from the user and thus not mapped to the legacy partition table 114. A hidden partition refers to a portion of a disk that is typically created using the SETMAX command as defined in the ATA/ATAPI-4 (NCITS 314-1998). The system's firmware also needs to support the firmware (BIOS) interface for accessing an area of an ATA drive that is normally hidden via the SETMAX command. This firmware interface provides services that an operating system may use to access the hidden area. The firmware interface is typically referred to as Protected Area Run Time Interface Extension Services or simply PARTIES. T13 is a Technical Committee for the National Committee on Information Technology Standards (NCITS) and maintains and controls all specifications relating to devices supporting the AT Attachment (ATA) storage interface. NCITS can be reached at http:/www.ncits.org. The computer system 100 thus includes hardfile with an integrated controller supporting the ATA storage interface that includes a SETMAX command. The hardfile supports at least the specification level, ATA/ATAPI-4 (NCITS317-1998) which is owned by the INCITS T13 Technical committee. More information can be found at http:/www.ncits.org/and http://www.t13.org/# Documents 2001. Furthermore, although the EPP table 116 and utility 118 are shown in a single partition 128, nothing prevents the EPP table 116 and utility 118 from being in different partitions.

Figure 2B:
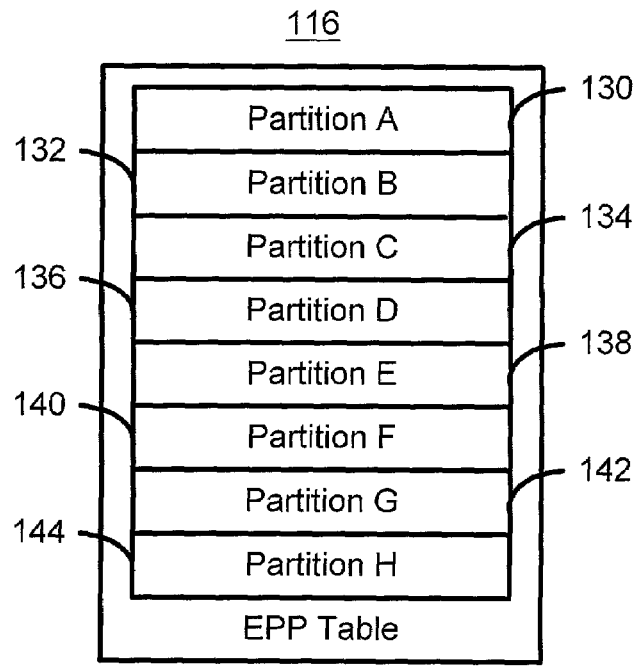
FIG. 2B is a block diagram depicting one embodiment of an extended physical partition table in accordance with the present invention.

FIG. 2B depicts one embodiment of the EPP table 116. The EPP table 116 includes entries 130, 132, 134, 136, 138, 140, 142 and 144 for eight partitions A, B, C, D, E, F, G and H. Although entries 130, 132, 134, 136, 138, 140, 142 and 144 for eight partitions are shown, the EPP table 116 could include another number of entries. However, the EPP table 116 can include more than four entries. As a result, more than four partitions can be provided in the computer system 100. Referring to FIGS. 2A and 2B, the partitions 120, 122, 124 and 126 that are provided on the hardfile 110, are selected from the partitions having entries 130, 132, 134, 136, 138, 140, 142 and 144 in the EPP table 116. In a preferred embodiment, up to four partitions 120, 122, 124 and 126 are provided on the hardfile 110 and visible to a user at a particular time because the legacy partition table 114 can include a maximum of four entries. However, in an alternate embodiment, where the legacy partition table can include additional entries, more partitions could be provided on the hardfile 110.

Referring to FIGS. 2A and 2B, the utility 118, the EPP table 116 and the hardfile adapter 104 are used to provide the partitions 120, 122, 124 and 126 from the available partitions A, B, C, D, E, F, G and H transparently to the operating system 102. The number of available partitions provided in accordance with the present invention is given by the number of partitions in the EPP table and is thus greater than four. As described above, the EPP table 116 stores information relating to the partitions 120, 122, 124 and 126 as well as additional partitions (not shown) in the entries 130, 132, 134, 136, 138, 140, 142 and 144. The EPP table 116 thus preferably contains entries 130, 132, 134, 136, 138, 140, 142 and 144 for the partitions A, B, C, D, E, F, G and H. The partitions 120, 122, 124 and 126 are selected from the possible partitions A, B, C, D, E, F, G and H.

The entries 130, 132, 134, 136, 138, 140, 142 and 144 in the EPP table 116 describe the physical layout of the media for the hardfile 110 as well as the starting and ending points for each of the partitions A, B, C, D, E, F, G and H. In a preferred embodiment, the EPP table 116 uses an addressing scheme based upon head, cylinder and sector addresses provided by the hardfile adapter 104. Thus, the starting address is cylinder 0, head 0 and sector 1. However, in an alternate embodiment, another addressing scheme, for example logical block addressing, could be used. In a preferred embodiment, the EPP table 116 allows for any number of partitions up to the total number of physical sectors in the hardfile 110 reported by the hardfile adapter 104. Also in a preferred embodiment, each entry 130, 132, 134, 136, 138, 140, 142 or 144 in the EPP table 116 has the same format and data as an entry in the legacy partition table 114 to facilitate mapping of portions of the EPP table 116 to the legacy partition table 114. In a preferred embodiment, the EPP table 116 is stored on a partition 128 that is dedicated to the hardfile adapter 104 and which does not appear on a usable sector map provided to a user.

The ED table 117 includes entries for each of a plurality images 119 and the events corresponding to the images 119. Each image 119 included in the ED table 117 includes a portion of the partitions 120, 122, 124 and 126 that is to be mapped to the legacy partition table 114. In a preferred embodiment, each image 119 includes no more than four partitions because the legacy partition table 114 can have up to four partitions. An active partition is also preferably marked in each image 119. The active partition is the partition that will be booted when the image 119 mapped to the legacy partition table 114 is booted. The ED table 117 also includes the events corresponding to the images 119. A particular image 119 is mapped to the legacy partition table 114 in response to an occurrence of the corresponding event(s) being detected.

The utility 118 provides an interface that allows a user to define the images 119. In a preferred embodiment, the utility 118 also allows a user to define (initialize and change) the partitions A, B, C, D, E, F, G and H. For example, the user could set or alter the number of partitions or the size of one or more partitions using the utility 118. The utility 118 also allows the user to select which of the partitions A, B, C, D, E, F, G and H are the partitions 120, 122, 124 and 126 mapped to the legacy partition table 114 and to select which of the mapped partitions 120, 122, 124 or 126 is the active bootable partition. In a preferred embodiment, the partitions 120, 122, 124 and 126 mapped to the legacy partition table 114 are provided in an image. The image is then used for mapping to the legacy partition table 114. In one embodiment, the utility 118 also allows the user, such as a network administrator, to define images for different users. However, in an alternate embodiment, a seperate utility (not shown) can be used to define the partitions 120, 122, 124, and 126. An image for a particular user includes the partitions 120, 122, 124 and 126 that are accessible to the particular user. In defining the images 119, the utility 118 allows the user to select which of the partitions A, B, C, D, E, F, G and H are part of the image 119 and to choose which event(s) correspond to the image 119. The utility 118 also allows the user to select which of the partitions 120, 122, 124 or 126 is the active bootable, partition. In addition, in one embodiment, the partition 128 in which the utility 118, EPP table 116 and the ED table 117 reside are only available to the network administrator are in a hidden partition 120 accessible only upon entry of the appropriate password.

In a preferred embodiment, the utility 118 also passes the data relating to the EPP table 116 to the hardfile adapter 104. The utility 118 preferably builds the EPP table 116 and the ED table 117. The combination of the utility 118 and the hardfile adapter 104 maps an image 119 in the ED table 117 to the legacy partition table 114, and thus the master boot record 112, such that the partitions 120, 122, 124 and 126 are transparent to the operating system. Thus, the operating system need not have any additional information relating to the partitions 120, 122, 124 and 126 in the image 119 and need not be aware of the existence of more than four partitions. In a preferred embodiment, the partitions 120, 122, 124 and 126 in the image 119 are consecutively mapped to make the partitions 120, 122, 124 and 126 transparent to the operating system 102. Consecutive mapping is carried out such that the partitions in the image 119 mapped to the master boot record 112 (i.e. the partitions 120, 122, 124, and 126) appear to the operating system to be sequential. Consecutive mapping is preferably carried out by mapping the partitions 120, 122, 124, and 126 to the legacy partition table 114 and providing a translation for the partitions 120, 122, 124, and 126 mapped to the legacy partition table 114. Consecutive mapping is preferably carried out using the utility 118 and the hardfile adapter 102. The utility 118 maps the partitions in the EPP table 116 listed in the image 119 to the legacy partition table 114 in the master boot record 112. The hardfile adapter 104 provides the translation. The translation makes it appear to the operating system 102 that the partitions 120, 122, 124 and 126 are consecutive and contiguous. In other words, the partitions 120, 122, 124 and 126 are mapped to the legacy partition table 114 such that the partitions 120, 122, 124 and 126 appear to the operating system 102 to be sequential. As a result, the mapping of the partitions 120, 122, 124 and 126 is transparent to the operating system 102. In addition, the image 119 preferably includes no more than four of the possible partitions A, B, C, D, E, F, G and H.

For example, suppose that the hardfile 110 has a forty GByte capacity and that the entries 130, 132, 134, 136, 138, 140, 142 and 144 in the EPP table 116 describe eight partitions as follows (using sectors for addressing rather than the preferred cylinder, head and sector address): Partition A: 0–1,999,999 sectors; Partition B: 2,000,000–9,999,999 sectors; Partition C: 10,000,000–15,999,999 sectors; Partition D: 16,000,000–29,999,999 sectors; Partition E: 30,000,000–39,999,999 sectors; Partition F: 40,000,000–49,999,999 sectors; Partition G: 50,000,000–59,999,999 sectors; Partition H: 60,000,000–78,124,999 sectors. Suppose that a user has selected Partitions A, E, H and B to be part of the image 119 that is to be mapped in response to a particular event. In other words, the user has defined the image 119 as including Partitions A, E, H and B.

In response to detection of the particular event, the utility 118 maps sectors A, E, H and B to the legacy partition table 114. The utility 118 also provides information relating to the partitions A, E, H and B to the hardfile adapter 104, which creates a translation for these partitions. The translation preferably takes the form of a translation table. The translation translates the addresses of the partitions A, E, H and B such that the partitions A, E, H and B appear to have sequential address. Thus, the partitions A, E, H and B appear to the operating system 102 to have the following map: Legacy Partition 1 (Partition A): 0–1,999,999 sectors; Legacy Partition 2 (Partition E): 2,000,000–11,999,999 sectors; Legacy Partition 3 (Partition H): 12,000,000–30,124,999 sectors; Legacy Partition 4 (Partition B): 30,125,000–38,124,999 sectors.

Thus, the partitions in the image 119 are consecutively mapped to the legacy partition table 114. Each of the partitions has the appropriate size as mapped to the legacy partition table 114. The partitions mapped to the legacy partition table 114 appear to the operating system 102 as consecutive and as though these are the only partitions on the hardfile 110 even though the partitions may not be consecutive and may be only a portion of the partitions actually on the hardfile 110. The fact that there are additional partitions (Partitions C, D, F and G) and that the partitions are not actually consecutive is transparent to the operating system 102. Thus, the operating system need not have any additional information relating to the partitions 120, 122, 124 and 126 and need not be aware of the existence of more than four partitions mapped to the legacy partition table 114. Moreover, it is not required that the user perform any additional operations to provide the partitions 120, 122, 124 and 126. For example, no flag is required to be set in the master boot record 112.

Figure 3:
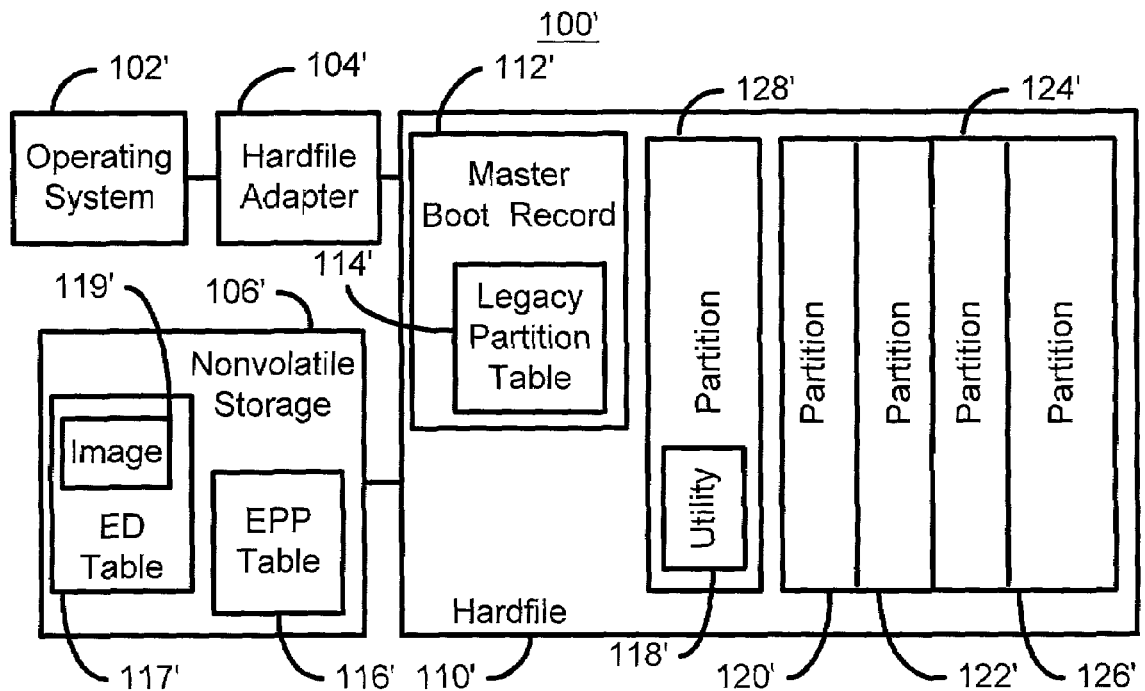
FIG. 3 is a block diagram depicting a second embodiment of a computer system in accordance with the present invention that maps different partitions to the master boot record based upon the events occurring on the computer system.

FIG. 3 is a block diagram depicting a second embodiment of a computer system 100' in accordance with the present invention that that maps different partitions to the master boot record 112' based upon the events occurring on the computer system 100'.

The components of the computer system 100' are analogous to the computer system 100 depicted in FIG. 2A. Thus, components of the computer system 100' of FIG. 3 are numbered similarly to the components of the computer system 100 shown in FIG. 2A. However, the EPP table 116' and ED table 117' are stored on the nonvolatile storage 106' on the system planar board rather than on the hardfile 110'. The EPP table 116' and ED table 117' are stored on nonvolatile storage (not explicitly shown) in the hardfile adapter 104'. However, the computer system 100' functions in a manner analogous to the computer system 100. Consequently, both the computer system 100 and the computer system 100' can provide images 119 which are mapped to the legacy partition table 114 or 114', respectively, in response to detecting the corresponding event(s)1

Figure 4:
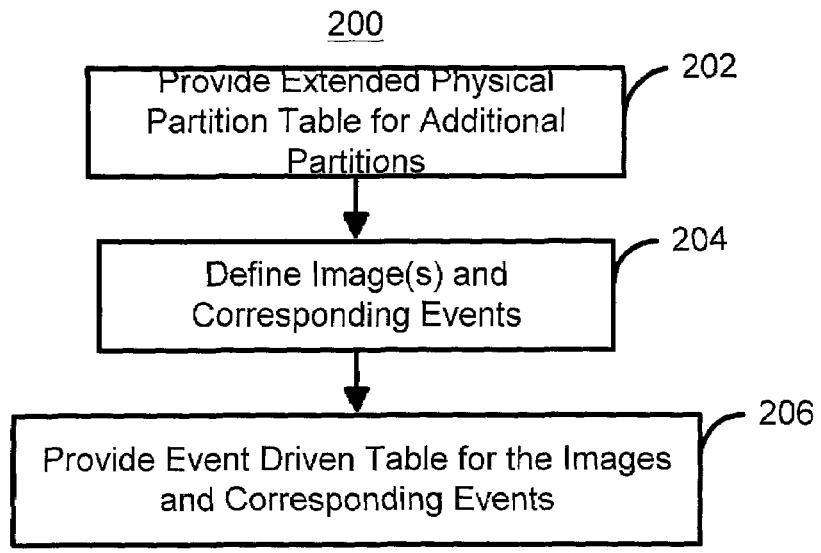
FIG. 4 is a high-level flow chart depicting one embodiment of a method in accordance with the present invention for allowing the computer system to map different partitions to the master boot record based upon the events occurring on the computer system.

FIG. 4 is a high-level flow chart depicting one embodiment of a method 200 accordance with the present invention for allowing the computer system to map different partitions to the master boot record based upon the events occurring on the computer system. The method 200 can be used by the computer system 100 and 100'. For clarity, the method 200 is described in conjunction with the computer system 100. The method 200 preferably commences after the computer system 100 has been booted up. In a preferred embodiment, the computer system 100 is powered on, the utility 118 booted up prior to the method 200 starting.

The EPP table 116 is provided, preferably the utility 118, via step 202. As discussed above, the EPP table 116 describes the plurality of partitions A, B, C, D, E, F, G and H. The user is allowed to define at least one image 119 using the utility 118, via step 204. Step 204 includes defining the portion of the partitions 120, 122, 124 and 126 in the image 119 as well as the corresponding event. The image 119 will be mapped to the master boot record 112 in response to the detection of an occurrence of the corresponding event.

The ED table 117 is then built based upon the information provided by the user, via step 206. In a preferred embodiment, step 206 is performed by the utility. The utility 118 creates or revises the ED table 117, preferably using new commands tailored to providing the partitions A, B, C, D, E, F, G and H in step 206. The utility 118 may also pass the information received from the user, such as the identity of the partitions and the event, to the hardfile adapter 104.

Figure 5:
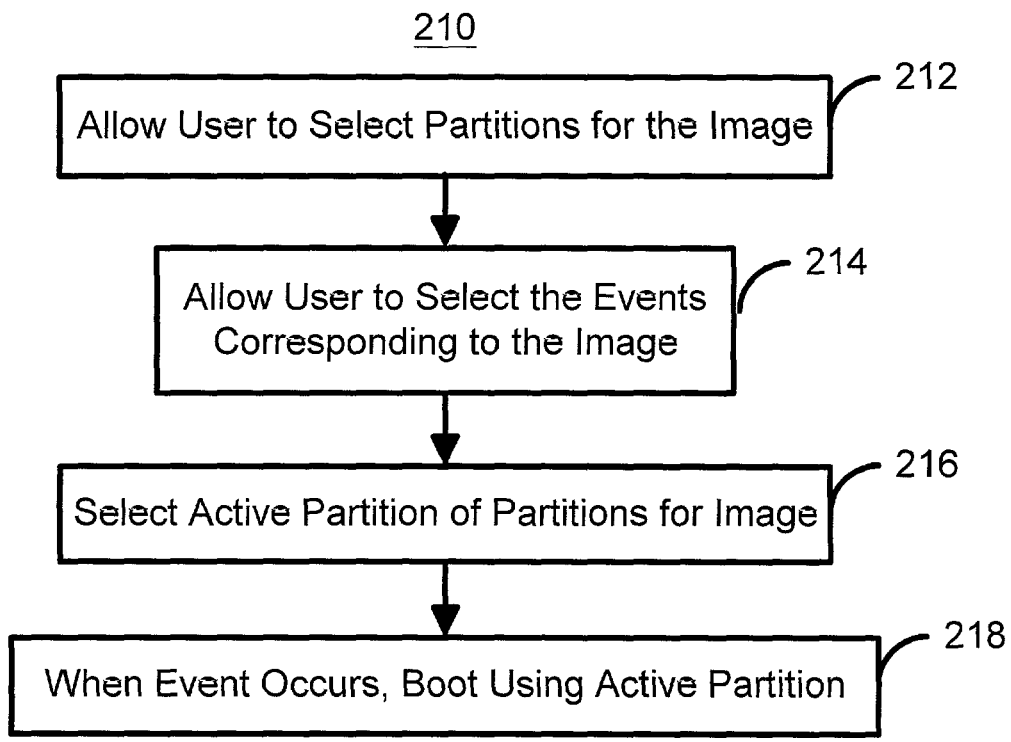
FIG. 5 is a high-level flow chart depicting one embodiment of a method in accordance with the present invention for providing an image.

FIG. 5 is a high-level flow chart depicting one embodiment of a method 210 in accordance with the present invention for providing an image 119. The method 210 can be used by the computer system 100 and 100'. For clarity, the method 210 is described in conjunction with the computer system 100. The method 210 is preferably used for performing the step 204 for each of the images 119 in the ED table 117.

The user is allowed to select which of the partitions 120, 122, 124, and 126 are part of the image 119, via step 212. Preferably, step 212 is performed by using the utility to provide a graphical user interface which prompts the user for the partitions to be included in the image 119. Because the master boot record 112, which is preferably a conventional master boot record, only recognizes up to four partitions, step 212 preferably allows a user to select up to four of the partitions 120, 122, 124 and 126. The user is allowed to select the event(s) corresponding to the image 119, via step 214. The image 119 will be mapped to the legacy partition table 114 in response to the event(s). The user is allowed to select a partition within the image 119 as the active partition, via step 216. The active partition will be booted when the hardfile 110 is booted after the image 119 has been mapped to the legacy partition table 114 and the hardfile adapter 104 is notified of the new image 119. Thus, the active partition is booted upon occurrence of the corresponding event, via step 218.

FIG. 5 is a high-level flow chart depicting one embodiment of a method 220 in accordance with the present invention for mapping the image 119 to the master boot record 112, preferably transparently to the operating system 102. The method 220 can be used by the computer system 100 and 100'. For clarity, the method 220 is described in conjunction with the computer system 100. The method 220 preferably commences after the system has powered on and completed some of the normal power on self test (POST) operations.

It is determined whether one of the events in the ED table 117 has occurred, via step 222. If not, normal POST operations are performed, via step 225. If one of the events in the ED table 117 has occurred, then the corresponding image 119 is mapped to the legacy partition table 114, via step 224. In a preferred embodiment, step 224 maps the image to the legacy partition table 114 in a manner that is transparent to the operating system 102. Also in a preferred embodiment, the mapping is consecutive, as described above. The partitions are consecutively mapped so that partitions in the image 119 that are not physically adjacent are seen as being adjacent by the operating system 102. This consecutive mapping of the portion of the partitions 120, 122, 124, and 126 in the image 119 allows the portion of the partitions 120, 122, 124, and 126 in the image 119 to be used without requiring additional information to be provided to the operating system 102.

Figure 7A:
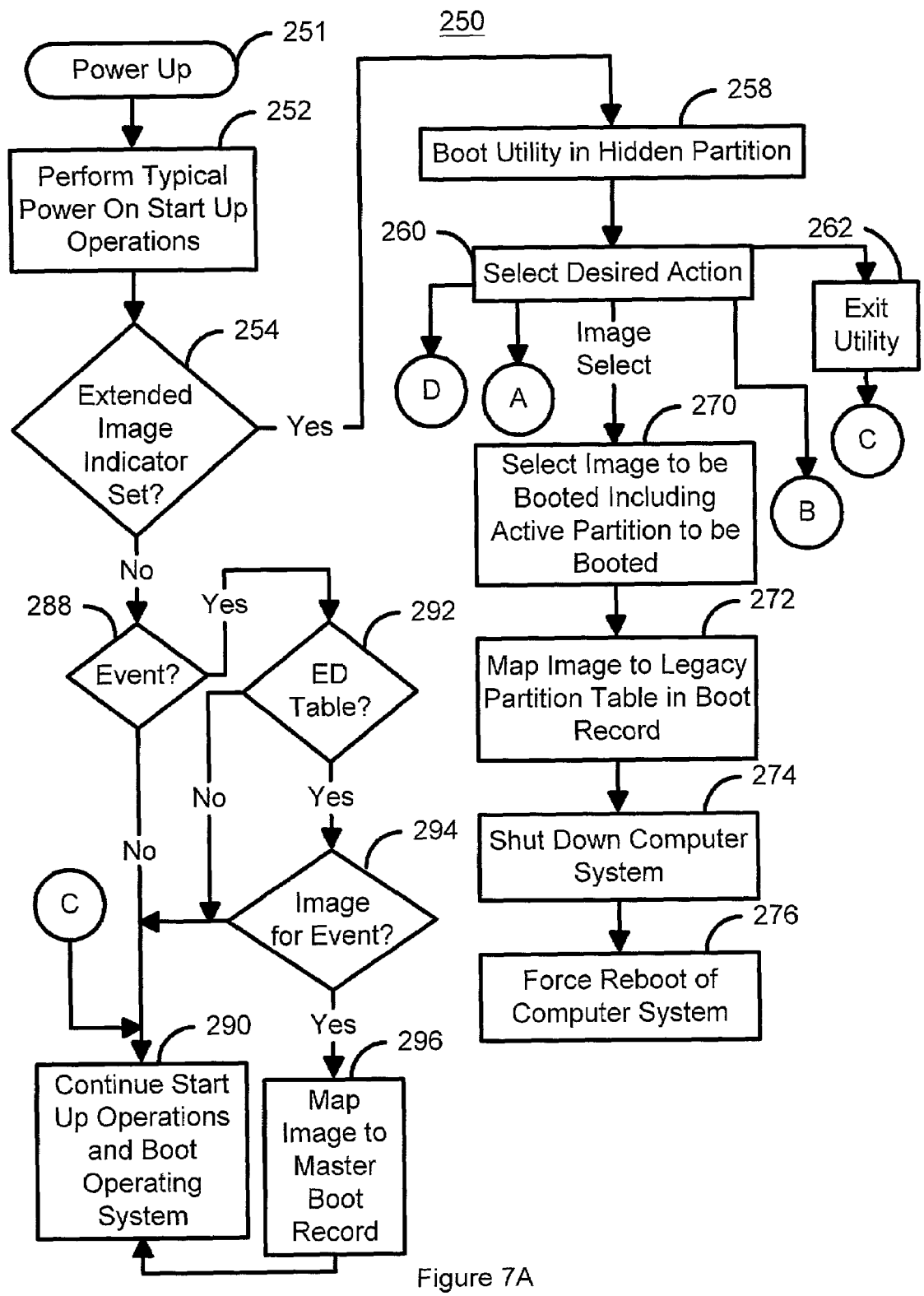
FIGS. 7A and 7B depict a more detailed flow chart of a preferred embodiment of a method in accordance with the present invention for mapping different partitions to the master boot record based upon the events occurring on the computer system.
Figure 7B:
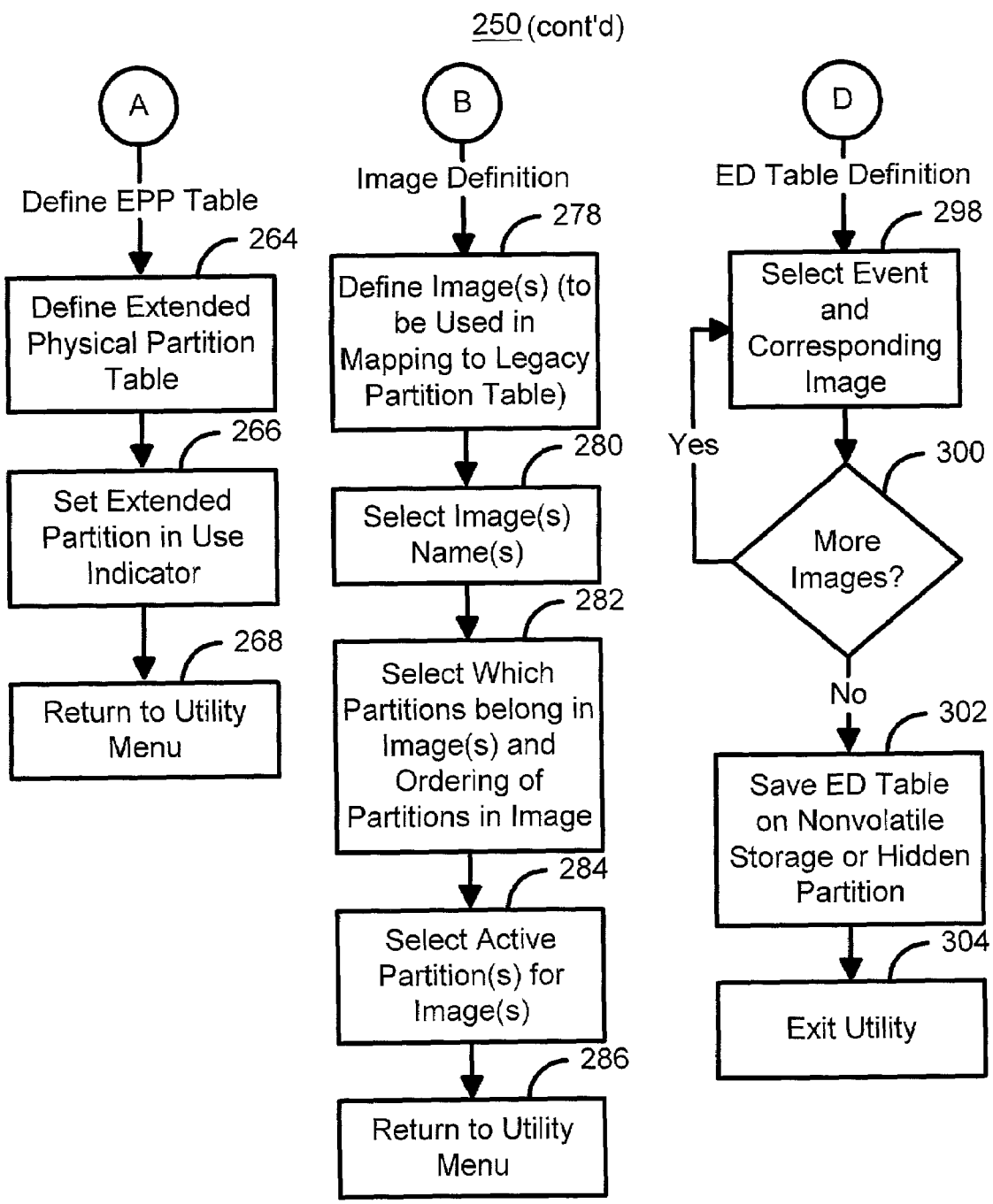

FIGS. 7A and 7B depict a more detailed flow chart of a preferred embodiment of a method 250 in accordance with the present invention. The method 250 can be used by the computer system 100 and 100'. For clarity, the method 250 is described in conjunction with the computer system 100.

The computer system 100 is powered up, via step 251. The typical POST operations performed after power on are carried out, via step 252. It is determined whether an extended image indicator is set using POST, via step 254. The indicator informs the computer system 100 that the hardfile adapter 104, the EPP table 116, the utility 118 and possibly the ED table 117 are used to provide additional partitions. The extended image indicator could be set using a separate utility (not shown) or using an additional step in the method 250. When the extended image indicator is set in the method 250 or using the separate utility, the next time the computer system 100 is booted, the utility 118 is booted in step 258, discussed below. If it is determined that the indicator is not set, then it is determined whether an event, such as a wake up event, has occurred, via step 288. If not, then the normal POST operations are continued and the operating system 100 is booted, via step 290.

If it is determined that an event has occurred, then it is determined whether the ED table 117 exists, via step 292. If not, then step 290 is returned to. Otherwise, it is determined whether the event has a corresponding image in the ED table, via step 294. If not, then step 290 is returned to. If so, then the image 119 corresponding to the event is mapped to the legacy partition table 114 in the master boot record 112, via step 296.

If it is determined in step 254 that the indicator is set, then the utility 118, which is preferably in a partition 128 that is hidden, is booted, via step 258. The user is then prompted to select the desired action, via step 260. Step 260 preferably includes providing the user with a graphical user interface depicting the user's options. In the embodiment shown, the user's options include defining the ED table 117, defining the EPP table 116, selecting an image to be mapped to the legacy partition table 114, defining an image or exiting the utility 118. If the user selects to exit the utility, then the utility is exited in step 262. Step 256 is then returned to and the operating system booted.

Figure 6:
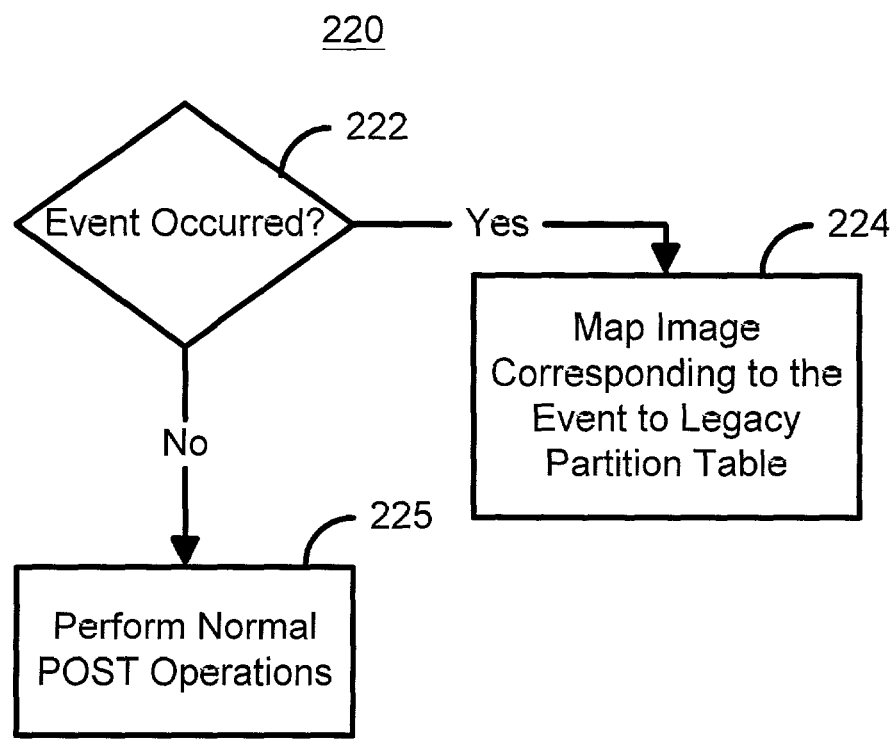
FIG. 6 is a high-level flow chart depicting one embodiment of a method in accordance with the present invention for mapping the image to the master boot record transparently to the operating system.

If the user selects to define the EPP table, then the EPP table is defined, via step 264. Step 264 preferably includes allowing the user to define the partitions A, B, C, D, E, F, G and H using the utility 118 as well as building the EPP table 116 using the utility 118. Preferably step 264 is carried out as described above in the methods 200, 210 and 220 of FIGS. 4, 5 and 6, respectively. Referring back to FIGS. 7A and 7B, the extended partition in use indicator is set, via step 266. Thus, the computer system 100 is informed that additional partitions may be provided through the hardfile adapter 104, the EPP table 116 and the utility 118. The menu of the utility provided in step 260 is returned to, via step 268.

If the user desires to select the image to be mapped to the legacy partition table 114 and, therefore, booted, then step 270 is performed. Thus, the user is allowed to select an image to be booted including the active partition to be booted, via step 270. The image preferably includes no more than four partitions 120, 122, 124 and 126 because the legacy partition table 114 is capable of storing information relating to only four partitions. The image is consecutively mapped to the legacy partition table, via step 272. Thus, step 272 could be seen as writing a new partition table, which replaces the old legacy partition table 114, to the master boot record 112. The consecutive mapping preferably includes mapping to the legacy partition table 114 and providing a translation and is preferably carried out using the utility 118 and the hardfile adapter 104 as described above with respect to FIG. 5. The computer system 100 is shut down, via step 274. A forced reboot of the computer system 100 performed, via step 276. Thus, the computer system 100 will reboot using the portion of the partitions 120, 122, 124 and 126 that have been mapped to the legacy partition table 114.

If the user desires to define the image to be mapped to the legacy partition table 114, then step 278 is performed. Thus, the image to be mapped to the legacy partition table 114 is defined, in step 278. A name is chosen for the image, via step 280. The portion of the partitions A, B, C, D, E, F, G and H in the EPP table 116 that are to be in the image are then selected, via step 282. Step 282 also includes selecting the order of the partitions 120, 122, 124 and 126 within the image. The partition 120, 122, 124 or 126 of the selected partitions that is to be used as the active partition is chosen, via step 286. Thus, the definition of the image is complete and the menu of the utility 118 is returned to, via step 286.

If the user desires to define the ED table 117, then the user is allowed to select an event and the associated image, via step 298. Step 298 preferably includes performing the method 210 described in FIG. 5. Referring back to FIGS. 7A and 7B, it is determined whether there are additional images to be defined, via step 300. If so, then step 298 is returned to. Otherwise, the ED table 117 is saved into nonvolatile storage, via step 302. The utility 118 is then exited, via step 304.

Thus, images which can be mapped to the master boot record are provided. These images can include different partitions and have different active partitions. Different images are also mapped to the legacy partition table in response to different events. Consequently, the master boot record and partition booted can adapt to the status of the computer system 100 and/or 100'.

A method and system has been disclosed for providing an event driven image used in booting the computer system. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing an event driven hardfile image in a computer system, the computer system including a hardfile, a hardfile adapter, a master boot record and an operating system, the method comprising the steps of:
   (a) providing an extended physical partition table describing a plurality of partitions on the hardfile, the extended physical partition table for increasing a number of partitions available on the computer system such that the plurality of partitions is greater than a default set of partitions otherwise available on the computer system;
   (b) allowing the user to define at least one image using a utility, each of the at least one image corresponding to at least a portion of the plurality of partitions and to a corresponding event, an image of the at least one image being mapped to the master boot record in response to an occurrence of the corresponding event, wherein the step of allowing the user to define the at least one image further includes the step of
      (b1) allowing the user to select the corresponding event for each of at least one image;
      (b2) allowing the user to select the portion of the plurality of partitions for each of the at least one image; and
   (c) providing an event driven table including each of the at least one image.

2. The method of claim 1 further comprising the step of:
   (d) mapping the image of the at least one image to the master boot record in response to the occurrence of the corresponding event.

3. The method of claim 2 wherein the mapping step (d) further includes the step of:
   (d1) mapping the image of the at least one image to the master boot record in response to the occurrence of the corresponding event such that the portion of the plurality of partitions in the image is transparent to the operating system.

4. A method for providing an event driven hardfile image in a computer system, the computer system including a hardfile, a hardfile adapter, a master boot record, an operating system, and a legacy partition table, the method comprising the steps of:
- (a) providing an extended physical partition table describing a plurality of partitions on the hardfile;
- (b) allowing the user to define at least one image using a utility, each of the at least one image corresponding to at least a portion of the plurality of partitions and to a corresponding event, an image of the at least one image being mapped to the master boot record in response to an occurrence of the corresponding event;
- (c) providing an event driven table including each of the at least one image; and
- (d) mapping the image of the at least one image to the master boot record in response to the occurrence of the corresponding event, the mapping step further including
- (d1) consecutively mapping the portion of the plurality of partitions in the image to the legacy partition table.

5. The method of claim 1 wherein the event driven table is stored on a nonvolatile storage.

6. The method of claim 1 wherein the event driven table is stored on a partition of the plurality of partitions.

7. The method of claim 1 further wherein the step of allowing the user to define the at least one image defining (b) further includes the step of:
- (b1) allowing the user to select a partition of the portion of the plurality of partitions as a bootable partition.

8. A computer system including a hardfile, a hardfile adapter, a master boot record and an operating system, the computer system comprising:
- an extended physical partition table describing a plurality of partitions on the hardfile, the extended physical partition table for increasing a number of partitions available on the computer system such that the plurality of partitions is greater than a default set of partitions otherwise available on the computer system;
- a utility for defining at least one image, each of the at least one image corresponding to at least a portion of the plurality of partitions and to a corresponding event, an image of the at least one image being mapped to the master boot record in response to an occurrence of the corresponding event; and
- an event driven table including each of the at least one image;
- wherein the utility allows the user to select the corresponding event for each of at least one image and allows the user to select the portion of the plurality of partitions for each of the at least one image.

9. The computer system of claim 8 wherein the utility allows a user to define the plurality of partitions on the hardfile and passes data relating to a portion of the plurality of partitions to the hardfile adapter.

10. The computer system of claim 9 wherein the utility further maps the image of the at least one image to the master boot record in response to the occurrence of the corresponding event.

11. The computer system of claim 10 wherein the utility maps the image to the master boot record in response to the occurrence of the corresponding event and wherein the hardfile adapter provides a translation for the image mapped to the master boot record in response to the occurrence of the corresponding event.

12. A computer system including a hardfile, a hardfile adapter, a master boot record an operating system, and a legacy partition table, the computer system comprising:
- an extended physical partition table describing a plurality of partitions on the hardfile;
- a utility for defining at least one image, each of the at least one image corresponding to at least a portion of the plurality of partitions and to a corresponding event, an image of the at least one image being mapped to the master boot record in response to an occurrence of the corresponding event, the utility mapping the image of the at least one image to the master boot record in response to the occurrence of the corresponding event; and
- an event driven table including each of the at least one image;
- wherein the utility consecutively maps the portion of the plurality of partitions in the image to the legacy partition table.

13. The computer system of claim 8 wherein the event driven table is stored on the nonvolatile storage.

14. The computer system of claim 8 wherein the event driven table is stored on a partition of the plurality of partitions.

15. The computer system of claim 8 further wherein the utility further allows the user to select a partition of the portion of the plurality of partitions as a bootable partition.

* * * * *